United States Patent [19]

Bolin

[11] 4,023,005
[45] May 10, 1977

[54] LASER WELDING HIGH REFLECTIVITY METALS

[75] Inventor: Stephen R. Bolin, Reading, Mass.

[73] Assignee: Raytheon Company, Lexington, Mass.

[22] Filed: Apr. 21, 1975

[21] Appl. No.: 570,104

[52] U.S. Cl. .................. 219/121 LM; 331/DIG. 1
[51] Int. Cl.² ........................................ B23K 9/00
[58] Field of Search ... 219/121 L, 121 LM, 121 EB, 219/121 EM; 331/DIG. 1; 228/193, 194, 195, 254, 263

[56] References Cited
UNITED STATES PATENTS

| | | | |
|---|---|---|---|
| 3,424,890 | 1/1969 | Ruyven | 219/121 LM |
| 3,473,000 | 10/1969 | Siekman et al. | 219/121 LM |
| 3,787,873 | 1/1974 | Sato et al. | 219/121 LM X |

OTHER PUBLICATIONS

"Continuous Butt Welding Using a Carbon Dioxide Laser" by Alwang, et al., Mar. 1969.
"Electron Beam and Laser Beam Technology" by Marton & El-Kareh, pp. 157-177, 1968.

*Primary Examiner*—Bruce A. Reynolds
*Assistant Examiner*—Mark Paschall
*Attorney, Agent, or Firm*—Harold A. Murphy; Joseph D. Pannone; John T. Meaney

[57] ABSTRACT

A method of welding high reflectivity materials by laser radiation comprising cladding material in the area to be welded with a low reflectivity material and subsequently directing a coherent beam of laser radiation, pulsed or continuous, onto the clad material to form in the weld area a molten alloy of the two materials which, when cooled, forms a weld nugget which is integrally bonded with the high reflectivity material.

16 Claims, 6 Drawing Figures

U.S. Patent  May 10, 1977  4,023,005
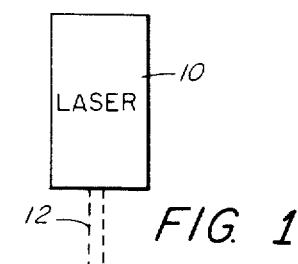
FIG. 1
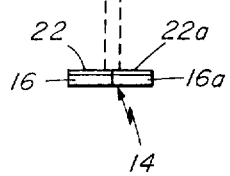
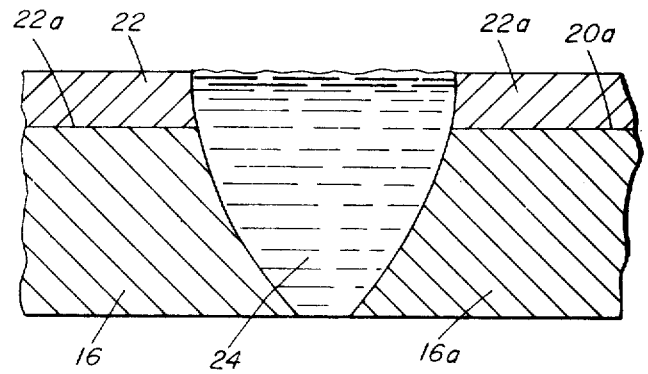
FIG. 2
FIG. 3
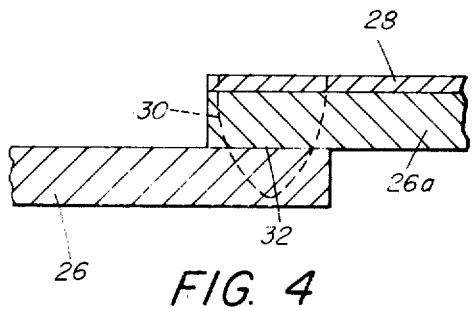
FIG. 4
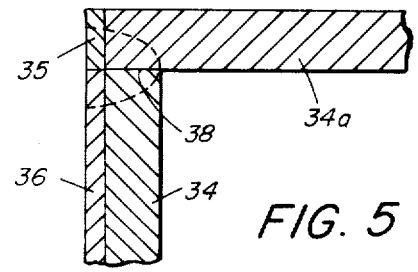
FIG. 5
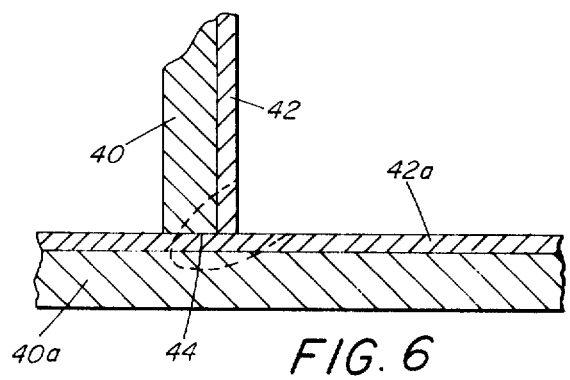
FIG. 6

4,023,005

LASER WELDING HIGH REFLECTIVITY METALS

BACKGROUND OF THE INVENTION

This invention relates to welding generally, and particularly to welding by heat produced by laser radiation.

It is well known that high reflectivity materials are particularly difficult to weld when using a laser as the source of welding heat. Laser radiation occurs in the visible and near-visible regions of the spectrum and, therefore, such radiation is easily reflected by a highly reflective surface and will not penetrate sufficiently deep enough to produce a weld. Application of a low reflection coating has been previously suggested as a technique for improving energy absorption but will not generally improve weldability. This is due to the fact that such coatings are vaporized during the initial impact of the laser beam upon the coating.

Plated, evaporated or electrodeposited coatings have proven to be of very limited value since practical limitations on such coating thicknesses are on the order of about 0.0005 inch (about 0.0127 millimeters).

SUMMARY OF THE INVENTION

This invention overcomes the foregoing and other objections of the prior art and is directed primarily to the use of clad materials in laser welding techniques wherein a highly reflective base metal to be welded is clad with a layer of selected low reflectivity metal of a thickness greater than about 0.0005 inch (about 0.0127 millimeters), which low reflectivity metal, in addition to being of low reflectivity to promote absorption of the laser energy, must not vaporize to an appreciable degree during the welding operation, and also must form an alloy with the base metal over a wide composition range.

In accordance with this invention it has been found that a clad layer of nickel on a base layer of copper, or a clad layer of palladium on a base layer of silver or gold is particularly suitable for this purpose.

This welding technique may be employed to weld any type of joint such as butt, lap, corner or T-joints, for example, by the use of pulsed or continuous wave lasers, as will be described.

BRIEF DESCRIPTION OF THE DRAWINGS

Other objectives of this invention will become apparent from the following description taken in connection with the accompanying drawings, wherein FIG. 1 is a diagrammatic view of a laser welding system wherein a laser is employed to weld a butt joint between a pair of clad metal members;

FIG. 2 is an enlarged sectional view of a pair of clad metal members to be butt welded;

FIG. 3 is an enlarged sectional view of the liquid weld nugget formed at the butt joint during a welding operation; and FIGS. 4, 5 and 6 are diagrammatic sectional views of lap, corner and T-joints respectively welded in accordance with this invention.

Description of the Preferred Embodiments

Referring more particularly to the drawings, there is shown in FIG. 1 a schematic illustration of a laser welding system wherein a laser 10 is employed to generate and direct a beam 12 of coherent radiation onto a workpiece 14 to be welded. The laser 10 may be a pulsed solid state laser of any well known type wherein a ruby crystal, for example, is activated and lazed to produce radiation at about 0.694 microns. Yttrium-aluminum-garnet crystals may be used to produce about 1.06 micron radiation, as well as neodymium-glass crystals which produce substantially similar wavelength radiation. Likewise, a gaseous continuous wave laser employing carbon dioxide, for example, as the lasting medium may be used to produce about 10.6 micron radiation.

Details of the laser 10 are well known and are not, therefore, provided herein.

In accordance with this invention the workpiece 14 actually comprises two separate members 16 and 16a of metal to be welded together. As seen in FIG. 2, the members 16 and 16a are placed with abutting edges forming a vertical junction 18 at their meeting point, and it is at this junction 18 where the members are to be welded together.

If the members 16 and 16a are made of nonreflective or relatively low reflectivity material, there will be no problem in employing conventional laser welding to join them together since the laser radiation will readily penetrate well into the material. However, if the members 16 and 16a are of high reflectivity material, a substantial portion of the radiation will be reflected off the surfaces of the members.

Therefore, in further accordance with this invention the surfaces 20 and 20a respectively of the members 16 and 16a carry a cladding layer 22 and 22a respectively, which cladding layers are thus interposed between the highly reflective surfaces 20–20a and the laser 10. The metal members 16 and 16a are preferably formed of copper, silver or gold which are highly reflective materials. If the members are of copper, the cladding metal of layers 22 and 22a will preferably be nickel. If the base metal members 16 and 16a are of silver or gold, the cladding layers 22 and 22a will preferably be palladium.

The cladding layers must be low reflectivity to promote absorption of the laser energy, must not vaporize to an appreciable degree when melted, and must be capable of forming an alloy with the base metal over a wide composition range.

The members 16 and 16a may be clad with the selected low reflectivity metal by well known metal cladding techniques such as metallurgical bonding under extremely high pressure with or without application of heat. The cladding must have a thickness of at least 0.0005 inch (about 0.4826 millimeters), in accordance with this invention.

When the laser beam 12 contacts the members being welded in the area of the junction 18, it will penetrate through the claddings 20–20a without substantial reflectivity and will penetrate deeply into or through the base layers 16–16a to melt both materials and form a liquid pool 24, as shown in FIG. 3, and when the radiation is terminated the pool 24 will solidify to form a nugget joining the two members 16–16a together as in a conventional weld. The nugget is an alloy formed by the combination of the metals of claddings 22–22a and members 16–16a, which alloy will vary in composition with variations in the thicknesses of the two metal layers.

It has been found that copper 0.019 inch (about 0.4826 millimeters) thick clad with nickel 0.0015 inch thick, for example, may be very satisfactorily welded with full penetration welds by using a pulsed YAG laser delivering 18 joules per pulse in 9 millisecond pulses. This technique can, of course, easily be extended to use with thicker base metals by combining a higher energy laser pulse with thicker cladding layers.

It will be seen from FIGS. 1–3 that a butt weld may be formed by directing the laser beam 12 from the laser 10 along a line substantially perpendicular to the surface of the work 14 to be welded.

In FIG. 4 two members 26 and 26a are disposed in overlapping arrangement with the uppermost member 26a carrying a clad layer 28. In this case, a weld nugget will be formed substantially as shown by dotted line 30 to weld the surfaces together in area 32 to form a lap weld.

The members 34 and 34a in FIG. 5 are arranged to form a corner structure with an end of member 34 abutting a side surface of member 34a near an end thereof. Member 34 is shown as carrying a clad layer 36, but member 34a must also carry a clad layer 35 on its adjacent end so that the laser beam will always first be directed onto the cladding before it penetrates the members to form a weld at the junction 38.

A T-weld, as shown in FIG. 6, can be made in accordance with this invention by providing two members 40 and 40a each with a respective clad layer 42 and 42a, then disposing an edge of member 40 in abutment with the cladding 42a on the other member. Then the laser beam is directed into the corner containing both claddings 42–42a to form a weld at junction 44.

It is apparent that the same technique may be used to promote welding by continuous wave lasers as well as pulsed lasers. In fact many metal surfaces will reflect to an extreme degree light at 10.6 microns from a gas laser, which surfaces do not reflect the shorter wavelength light produced by solid state lasers.

It will be apparent from the foregoing that all of the objectives of this invention have been achieved by the system shown and described wherein high reflectivity metals are clad with a low reflectivity metal to promote welding by lasers. It is obvious that the layer of cladding need only be present in the actual area where the weld is to take place. This technique is particularly useful in sealing packages which require some property of the high reflectivity metals such as RF shielding which cannot tolerate the high heat inputs common to other welding, soldering and brazing techniques.

It will also be apparent that various modifications and changes in the invention may be made by those skilled in the art without departing from the spirit of the invention as expressesd in the accompanying claims. Therefore all matter shown and described is to be interpreted as illustrative and not in a limiting sense.

What is claimed is:

1. A method of welding a high reflectivity metal member by laser radiation comprising cladding a surface of the member with a layer of low reflectivity metal to a thickness of at least 0.0005 inch, directing a beam of coherent electromagnetic radiation from a laser through said layer into said member to melt the materials of the layer and member in the area contacted by the beam, removing said beam, and allowing the melted materials to solidify to form an integral weld nugget comprising an alloy of the materials.

2. A method as set forth in claim 1 wherein said member is copper and said layer is nickel.

3. A method as set forth in claim 1 wherein said member is silver and said layer is palladium.

4. A method as set forth in claim 1 wherein said member is gold and said layer is palladium.

5. A method of welding together a pair of high reflectivity metal members by laser radiation comprising cladding a surface of each member with a layer of low reflectivity metal to a thickness of at least 0.0005 inch, disposing said members in side-by-side relation to form a junction therebetween with said layers being located in a common plane, directing a beam of coherent electromagnetic radiation from a laser through both of said layers and into the members at the junction between the members to melt the materials of the layers and members in the area contacted by the beam, removing said beam, and allowing the melted materials to solidify to form a weld nugget comprising an alloy of the materials joining the members together in an integral bond.

6. A method as set forth in claim 5 wherein said member is copper and said layer is nickel.

7. A method as set forth in claim 5 wherein said member is silver and said layer is palladium.

8. A method as set forth in claim 5 wherein said member is gold and said layer is palladium.

9. A method of welding together a pair of high reflectivity metal members by laser radiation comprising cladding a surface of one of said members with a layer of low reflectivity metal to a thickness of at least 0.0005 inch, disposing the clad member in overlying relation atop the unclad member with said layer being disposed on the side of the clad member away from the unclad member to form a junction between said members at adjacent surfaces, directing a beam of coherent electromagnetic radiation from a laser through said layer, said clad member, and said junction into the unclad member to melt the materials of the layer and members in the area contacted by the beam, removing said beam, and allowing the melted materials to solidify to form a weld nugget comprising an alloy of the materials joining the members together in an integral bond.

10. A method as set forth in claim 9 wherein said member is copper and said layer is nickel.

11. A method as set forth in claim 9 wherein said member is silver and said layer is palladium.

12. A method as set forth in claim 9 wherein said member is gold and said layer is palladium.

13. A method of welding together a pair of high reflectivity metal members by laser radiation comprising cladding a surface of at least one of said members with a low reflectivity metal to a thickness of at least 0.0005 inch, disposing the members in the desired abutting relation with the clad surface being in the path of a beam of coherent electromagnetic radiation from a laser and with the abutting surfaces forming a junction between the members in the area to be welded, operating the laser to direct the beam through said layer and into said members through the junction therebetween to melt the materials of the layer and members in the area contacted by the beam, discontinuing operation of said laser, and allowing the melted materials to solidify to form a weld nugget comprising an alloy of the materials joining the members together in an integral bond.

14. A method as set forth in claim 13 wherein said member is copper and said layer is nickel.

15. A method as set forth in claim 13 wherein said member is silver and said layer is palladium.

16. A method as set forth in claim 13 wherein said member is gold and said layer is palladium.

* * * * *